INVENTOR
RICHARD STANTON JONES
BY Larson and Taylor
ATTORNEYS

United States Patent Office 3,193,037
Patented July 6, 1965

3,193,037
MEANS TO REMOVE IMPURITIES FROM ENGINE AIR ON GROUND EFFECT VEHICLES
Richard Stanton Jones, Cowes, Isle of Wight, England, assignor to Westland Aircraft Limited, Yeovil, Somerset, England
Filed May 14, 1962, Ser. No. 194,637
Claims priority, application Great Britain, June 29, 1961, 23,499/61
10 Claims. (Cl. 180—7)

This invention relates to engine installations and more particularly to engine installations for machines currently referred to as machines of the "ground effect" or "hovercraft" type and to a method of entraining air for breathing and cooling purposes therefor.

One of the problems encountered in the operation of machines of the ground effect or hovercraft type is that of providing the engines with clean air for intake and cooling. Such machines under certain operating conditions over water generate a considerable amount of spray and when spray is admitted to the engines it shortens the obtainable engine operating time between inspections and overhauls and also engine life.

My invention provides an improved system of providing air for the engines of such machines by the application of which the admission of water is reduced to a considerable degree and furthermore the engine air is subjected to a first stage compression thus improving the engine performance and efficiency.

According to one feature of my invention a ground effect machine is provided with air for the engine or engines by diversion of a quantity of pressurised air from a flow of pressurised air feeding discharge jets which generate air cushion or cushions upon which the machine rides, the air diversion being effected at a region located between the pressurising fan and the discharge jets such that diversional change of direction causes separation of water from the air prior to engine intake.

When the engine is powered by gas turbine engines and pressurised air is diverted to the engine the pressurised air output available for generating the air cushion may be reduced but this is compensated by pressurisation of the diverted air to the engine under compression to improve engine efficiency and power output and also the engine efflux can be rearwardly directed to provide a component of forward thrust for propulsion.

The engine air is conveniently diverted from pressure air ducting through a cap in the outer wall of the ducting bend so that after diversion entrained water is separated therefrom by momentum imparted by the fan.

In the preferred arrangement the ducting between the fan and diversion gap directs the pressurised air stream either horizontally or substantially horizontally and the bend in which the diversion and water-separating gap is formed can then be a downward bend leading to the discharge jets, the engine air, after passing through the gap, being upwardly directed whilst the ongoing water is deflected downwardly to drainage after passing through the gap. To provide further separation, the engine air is diverted upwardly through bleed slots formed in a baffle plate. By this arrangement water separation in the order of 75% to 85% of the water content is achieved, thereafter a knit-mesh filter stage can be incorporated prior to the air reaching the engine or engines. The fan air intake is preferably located above the machine in the region of minimum spray to minimize the spray intake.

It will thus be understood that the invention includes a ground effect machine provided with one or more compressors for supplying air to cushion generating jets beneath the machine, the compressors acting also as water separators for engine air and superchargers providing first stage compression of engine intake air.

The invention is particularly suitable for incorporation in ground effect machines of the peripheral jet type and it will be understood that it includes also the preferred features in combination according to the preceding paragraphs and as hereinafter particularly described by way of example only as applied to a ground effect machine of the peripheral jet type with reference to the drawings accompanying the provisional specification in which.

Figure 1:
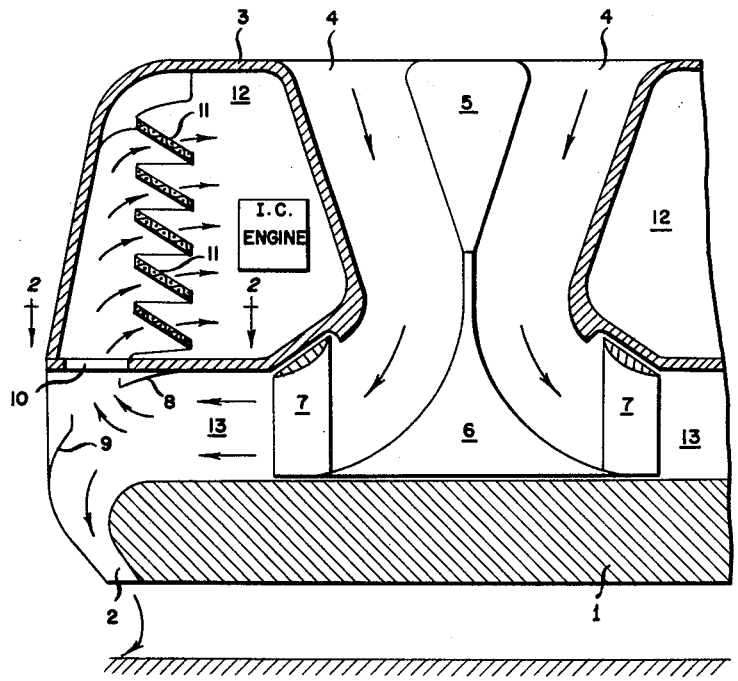
FIGURE 1 is a section through a centrifugal fan, fan ducting, engine duct, and peripheral jet.
Figure 2:
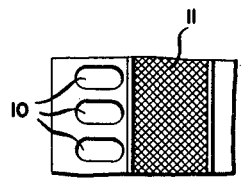
FIGURE 2 is a section on the line II—II of FIGURE 1.

Referring now to FIGURE 1, a "ground effect" machine generally indicated at 1 employs a peripheral jet system, the peripheral jet being indicated at 2. An engine room housing is indicated at 3, air intakes at 4, fan gearbox at 5, fan hub at 6, and fan blades at 7. A peripheral duct 13 leads to peripheral bleed slots 10 and also to the peripheral jet 2. Within the engine room itself is provided a readily removable fine knit-mesh filter through which the air for gas turbine engines which power the machines must pass before passing through the engines and out to atmosphere. Two water traps are provided within the peripheral duct, one forming a gap in the upper wall of the duct at a downward bend to the jets 2 with its lip extending beyond the inner edge of the bleed slots 10 and one on the outer casing leading to the peripheral jet 2. These water traps are connected to a conveniently arranged drain duct (not shown).

In operation of the invention when the engines are running and the "ground effect" machine is cushion-borne over water, considerable quantities of spray, which vary with the conditions prevailing, are thrown up by the lift jets.

Accordingly, it is desirable to provide the engine air intakes situated high up on the craft in a region where the spray is least dense, as illustrated in FIGURE 1. Air and water spray induced by the fan blades 7 is entrained through the air intake duct 4 and as it passes through the centrifugal fan considerable quantities of water are removed by the centrifuge action of the fan. This water is flung against the outer wall of the peripheral duct 13 where it runs down into water trap 9 and finally passes overboard. At this point in the peripheral duct 13 the entrained air which has now been compressed is divided, the main stream curving inwardly around the peripheral duct 13 to issue finally as a "jet curtain" through the peripheral jet 2. The secondary or diverted air stream is forced vertically upwards through the bleed slots 10, being turned back upon itself against the outer wall of the engine room housing 3 and passing through a knit-mesh filter 11, before entering the engine(s) and finally being discharged rearwardly to take advantage of any jet thrust available. Further quantities of water are removed as the air is turned against the outer wall of the engine room housing 3 and after passing through the knit-mesh filters substantially dry air is available for the engine(s). Water extracted by the knit-mesh filters will drain down to be caught by the water trap 8 and finally drained away. It will be appreciated by those skilled in the art that although part of the air stream forming the jet curtain and air cushion is bled off to provide breathing air for the engine(s) the loss is more than adequately compensated by power gained from the engine(s) through being supercharged in consequence of the engine air pressure.

It will also be appreciated that although the object of this invenition is to extract water from the spray laden air, should the "ground effect" machine pass over dusty ground or sand, the engines will be in some measure protected by the invention.

I claim as my invention:
1. In a ground effect machine, a base platform structure, a substantially continuous series of downwardly di- rected jets around the periphery of said base platform, fan means for generating pressurized air for discharge through said jets, means defining passages leading from the discharge of said fan means to said jets, said passages being disposed substantially transversely of the direction of said jets so as to conduct said air through an abrupt change of direction before it is discharged from said jets, means defining at least one opening in at least one of said passages in the portion of said passage incorporating said abrupt change of direction, said opening being oriented in said passage so as to face substantially oppositely from the direction of said jets, and means communicating with said openings for leading air passing therethrough to the power plant of said machine.

2. A ground effect machine comprising: a body structure having a platform-like base; a series of downwardly directed jets carried by said base for generating a supporting air cushion under said base; a fan for generating pressurized air, and an engine for driving said fan; passage means for conducting said pressurized air from said fan to said jets; diverting means for diverting a portion of said pressurized air from said passage means and for abruptly changing the direction of said portion to cause separation of water from said portion; and means for conducting said portion to the air intake of said engine.

3. In a ground effect machine having a base platform structure, a substantially continuous series of downwardly directed jets carried by said base platform structure for generating a supporting air cushion thereunder when pressurized air is forced to issue therefrom, an engine driven fan, and passage means for conducting pressurized air from the fan to the jets, the improvement comprising: means for diverting and changing the direction of a portion of the air in said passage means to at least partially remove the water therefrom and for conducting said portion to the engine driving said fan.

4. A body structure for a ground effect machine, comprising: a base platform structure; a continuously adjacent series of downwardly directed jets carried by said base platform for creating and maintaining a pressurized air supporting cushion under said base platform when pressurized air issues from said jets; a housing for a blower carried by said base platform and having an air inlet and at least one air outlet; passage means interconnecting said air outlet with said jets, said passage means having at least a substantially horizontally disposed portion and a substantially vertically disposed portion whereby air passing through said passage means undergoes an abrupt change of direction; an enclosure carried by said base platform structure for containing an engine to drive the fan; a diversion duct extending from said enclosure and opening into said passage means in the vicinity of said abrupt turn for diverting a portion of the air passing through said passage means and conducting the diverted air to said enclosure, said diversion duct opening into said passage means in the vicinity of said abrupt turn so as to cause the diverted portion to undergo an abrupt change in direction different from the directions of air travelling in said horizontal and vertical portions.

5. A ground effect machine comprising: a base platform structure; a continuously adjacent series of downwardly directed jets disposed about the periphery of said base platform structure; a blower carried by said base platform structure for generating pressurized air; passage means for conducting pressurized air from said blower to said jets, said passageway being at least in part substantially horizontally disposed and undergoing an abrupt change in direction to connect with said downwardly directed nozzles; a substantially vertically oriented opening in the upper wall of said passage means in the area of said abrupt change for diverting a portion of said air upwardly as the remainder is diverted downwardly; an engine for driving said blower; and means for conducting said diverted portion of pressurized air to said engine to serve as the air intake supply therefor.

6. Apparatus as set forth in claim 5 further comprising water trap means for trapping moisture separated from said pressurized air as said air is diverted abruptly downwardly to said jets and upwardly through said opening to said engine.

7. Apparatus as set forth in claim 6 further comprising filter means disposed between said opening and said engine for removing residual water from said diverted air.

8. Apparatus as set forth in claim 5 wherein said blower comprises a centrifugal blower having an intake in the upper portion of said machine in a region of minimum spray or dust and horizontally disposed discharge outlet means communicating with said passage means whereby moisture or dust will be centrifuged outwardly in said passage means against the outer wall of said passage means at the point of said abrupt change in direction and the upwardly diverted portion of pressurized air will be substantially reduced in water or dust content, wherein said substantially vertically oriented opening is one of a series of such openings forming a baffle and opening through the deck of said machine so as to place said passage means in communication with the enclosure for said engines.

9. Apparatus as set forth in claim 8 further comprising filter means disposed between said openings and said engines for removing residual moisture from the diverted air, and a water trap for collecting moisture centrifuged against the outer wall of said passage at the abrupt turn of said passage means by said blower and centrifuged against said outer wall by the abrupt upward turn of said diverted air through said openings.

10. In a ground effect machine of the peripheral jet type having a base platform structure, a series of continuously adjacent downwardly directed jets about the periphery of said base platform structure, a centrifugal blower for generating pressurized air and discharging said air horizontally, horizontally disposed air passages for conducting said pressurized air to the downwardly directed nozzles, an engine for driving the blower, and an enclosure for the engine located above the air passages, the improvement comprising: vertically oriented diversion openings in said air passages at the point where air in said passages is turned abruptly downwardly to issue from said jets, said openings being located in the upper walls of said air passages and communicating with said enclosure for said engine, whereby air is diverted abruptly upwardly through said openings so as to centrifuge moisture therefrom prior to passing to the air intakes of said engine.

References Cited by the Examiner

UNITED STATES PATENTS

| 2,583,651 | 1/52 | Horning | 123—41.65 X |
| 2,808,893 | 10/57 | Dorman et al. | 180—54 |
| 2,969,032 | 1/61 | Pinnes | 180—7 |
| 2,969,937 | 1/61 | Trojahn | 180—7 |

A. HARRY LEVY, *Primary Examiner.*

PHILIP ARNOLD, *Examiner.*